(No Model.) 3 Sheets—Sheet 1.

T. W. POWELL.
POTATO DIGGER.

No. 389,244. Patented Sept. 11, 1888.

Witnesses.

Inventor,
Thomas W. Powell,
by C. A. Snow & Co.
Attorneys.

(No Model.) 3 Sheets—Sheet 2.
T. W. POWELL.
POTATO DIGGER.
No. 389,244. Patented Sept. 11, 1888.
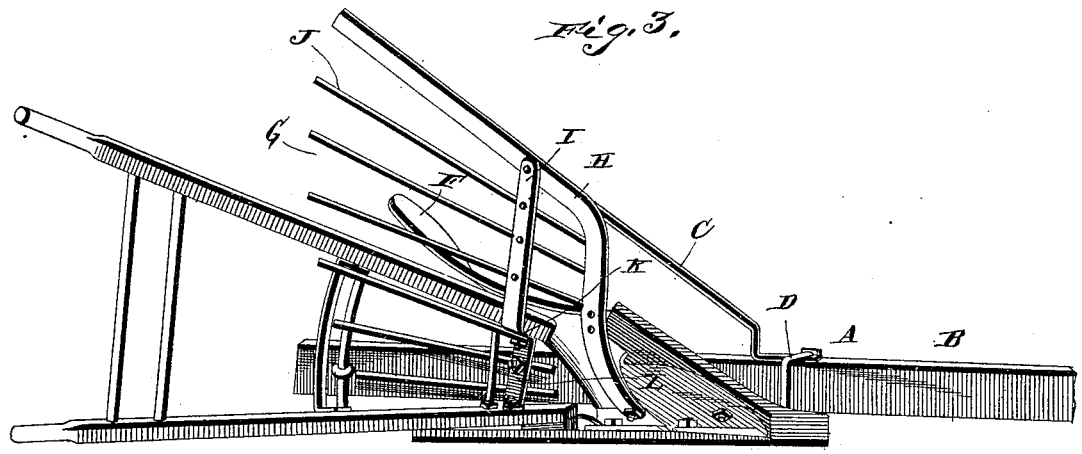
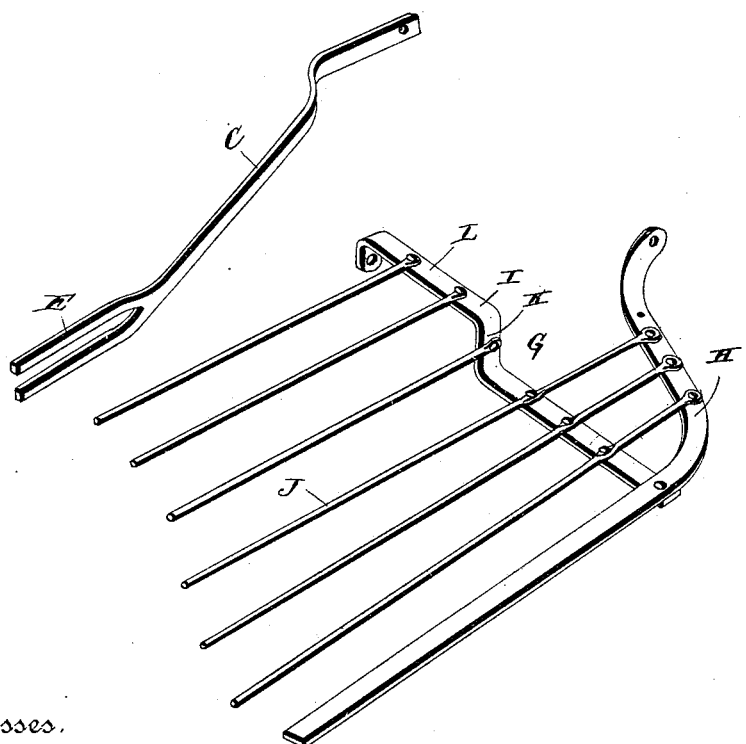
Witnesses:
T. L. Taylor
R. W. Bishop
Inventor,
Thomas W. Powell.
by C. A. Snow & Co.
Attorneys.

(No Model.)  T. W. POWELL.  3 Sheets—Sheet 3.
POTATO DIGGER.

No. 389,244.  Patented Sept. 11, 1888.

Witnesses.
C. L. Taylor
E. G. Siggers

Inventor,
Thomas W. Powell.
by C. A. Snow & Co.
Attorneys

UNITED STATES PATENT OFFICE.

THOMAS WHITNEY POWELL, OF FLUSHING, NEW YORK.

POTATO-DIGGER.

SPECIFICATION forming part of Letters Patent No. 389,244, dated September 11, 1888.

Application filed December 6, 1887. Serial No. 257,145. (No model.)

*To all whom it may concern:*

Be it known that I, THOMAS WHITNEY POWELL, a citizen of the United States, residing at Flushing, Long Island, in the county of Queens and State of New York, have invented new and useful Improvements in Potato-Diggers, of which the following is a specification.

My invention relates to improvements in potato-diggers; and it consists in certain novel features, hereinafter first fully described, and then pointed out in the claims.

Figure 1:
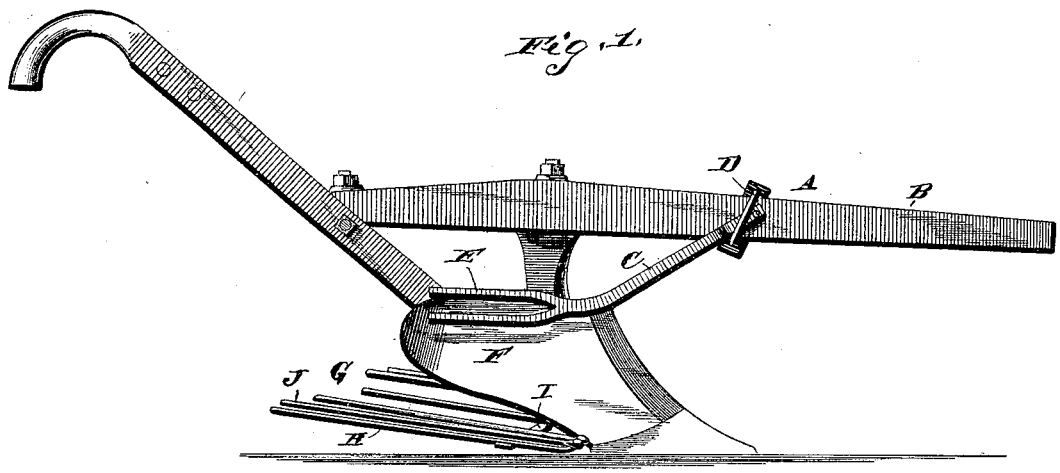
Figure 2:
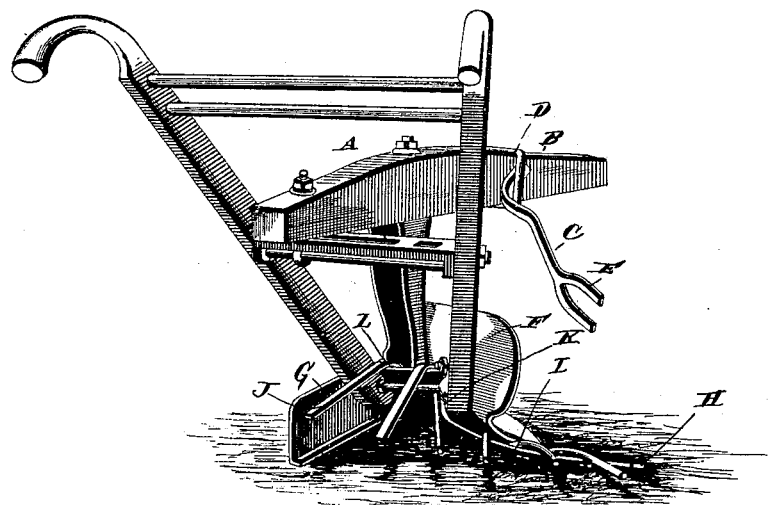
Figure 5:
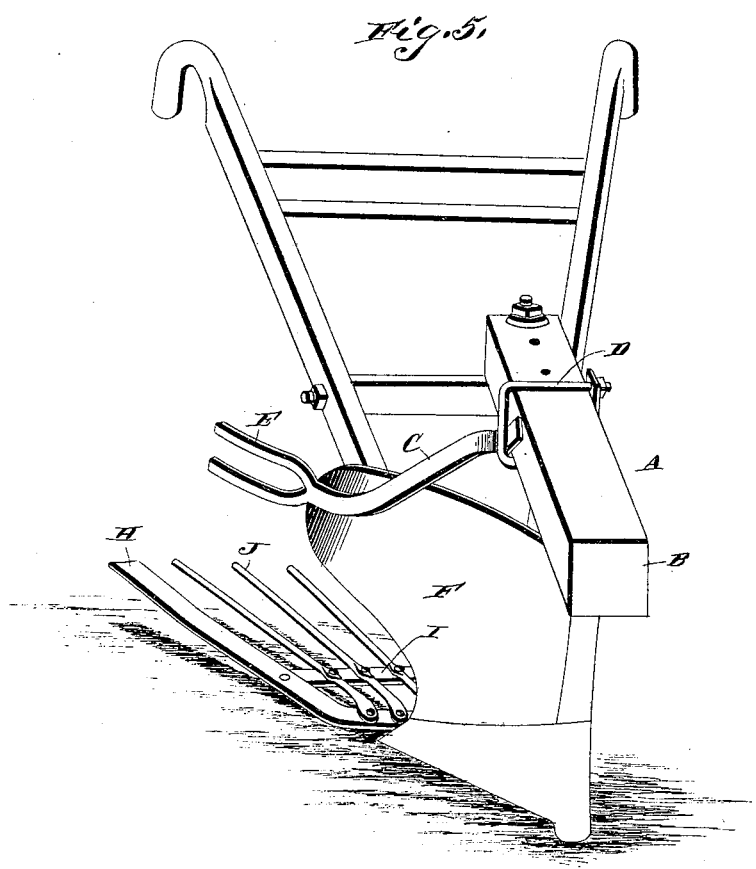

In the accompanying drawings, which fully illustrate my invention, Figure 1 is a side view of my improved device. Fig. 2 is a perspective view, looking at the rear; and Fig. 3 is a bottom plan view of the same. Fig. 4 is a detail view of the screen; and Fig. 5 is a perspective view, looking at the front of the plow.

Referring to the drawings by letter, A designates a turning-plow having my potato-digging attachments applied thereto. To the beam B of the plow, at a point in advance of the plow-standard, I secure a fender, C, by means of a clip, D, passed around the front end of the fender and the beam of the plow. This fender extends backward and outward about in a line with the upper edge of the mold-board, but in advance of the same, (see Figs. 2 and 5,) and prevents the potatoes falling back into the furrow and being plowed under. The free end of the fender is forked, as shown at E, so as to separate the potatoes from the earth and throw them to one side. To the rear side of the plowshare E, I secure the screen or sieve G, which consists of an irregular-shaped bar, H, secured to the mold-board and extending therefrom, and the bar I, secured thereto, and a series of diverging fingers or sifting-bars, J, supported by the said bars H I. The main bar H has its front end bolted to the plow-standard by the bolt which secures the mold-board to the standard. From this point the bar H passes downward, rearward, and outward to a point in rear of and in the same plane with the rear end of the sole of the plow. The bar is then given a broad turn and extends rearward and slightly upward a proper distance, according to the size of the plow. The cross-bar I is secured at one end to the bar H and extends inward therefrom toward the plow-handles. At a proper point just below the outer plow-handle this cross-bar is given an upward bend, providing the short vertical arm K, which is bolted to said handle. The cross-bar is also bent to form the horizontal portion L between the handles, and its end is secured to the inner handle. The outer fingers or separating-bars, J, are secured to the cross-bar I, and have their front ends secured to the bar H. The inner fingers or separating-bars are secured to the cross-bar I, and their front ends bear against the rear side of the standard. These fingers or separating-bars receive the potatoes and dirt turned up by the plow, and the motion imparted to them by the plow causes the dirt to separate from the potatoes and fall between the bars, and the said bars are so arranged as to form practically an inclined plane, down which the potatoes roll from the furrow.

From the foregoing description, taken in connection with the accompanying drawings, it will be seen that I have provided a very simple and efficient mechanism whereby all the potatoes will be turned out, and which will effectually prevent the potatoes falling back into the furrow, where they will be cut up and lost. The fender having the forked end serves to prevent the potatoes passing over the mold-board, while the spreading-bars are arranged directly over the furrow and prevent the potatoes falling back thereinto.

Having thus described my invention, what I claim, and desire to secure by Letters Patent, is—

1. A potato-digger attachment for plows, consisting of a screen-frame adapted to be secured to the rear side of an ordinary plow-standard in rear of the mold-board and plow-share, and extending rearward and laterally outward therefrom, said frame being detachable, whereby the entire frame can be removed bodily from the plow without separating any of the individual parts of the screen-frame, the latter being provided with a series of diverging fingers secured permanently and rigidly to said frame, and forming an inclined plane extending downward from the handles toward the mold-board to a point in rear of the same, the fingers being disconnected from the mold-board and from all parts of the plow, as set forth.

2. A potato-digger comprising the transverse bar I, adapted to be secured to and extend between the handles of an ordinary plow, and the diverging bars or fingers having their front ends secured to said bar I between the plow-handles, as set forth.

3. The combination, with a plow, of a screen consisting of the bar H, secured to the plow-share, the bar I, secured to and extending from the bar H, and diverging fingers secured upon the bars H I, substantially as specified.

4. The combination, with a turning-plow, of the bar H, secured to the rear side of the share, the bar I, secured to the bar H at right angles thereto, and the diverging fingers secured to said bars and having their outer ends arranged in an inclined plane, substantially specified.

5. The potato-digger consisting of the bar H, secured to the rear side of the standard and extending outward and rearward therefrom in rear of the mold-board to a point near the rear edge of the same, and then slightly upward, the bar I, secured to the bar H and extending transversely therefrom toward the handles, and having the vertical portion K secured to the outer handle and its inner end secured to the inner handle, and the diverging fingers secured to the bars H I, the outer ends of said fingers forming an inclined plane, as set forth.

In testimony that I claim the foregoing as my own I have hereto affixed my signature in presence of two witnesses.

THOMAS WHITNEY POWELL.

Witnesses:
WILLIAM VAN SICLEN,
DANIEL C. TOWNSEND.